(12) United States Patent
Saito et al.

(10) Patent No.: US 10,560,473 B2
(45) Date of Patent: Feb. 11, 2020

(54) METHOD OF NETWORK MONITORING AND DEVICE

(71) Applicant: FUJITSU LIMITED, Kawasaki-shi, Kanagawa (JP)

(72) Inventors: Satomi Saito, Kawasaki (JP); Satoru Torii, Yokohama (JP); Katsunari Yoshioka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 144 days.

(21) Appl. No.: 15/713,802

(22) Filed: Sep. 25, 2017

(65) Prior Publication Data
US 2018/0097833 A1 Apr. 5, 2018

(30) Foreign Application Priority Data
Oct. 3, 2016 (JP) .................... 2016-195882

(51) Int. Cl.
*H04L 29/00* (2006.01)
*H04L 29/06* (2006.01)
*G06F 21/50* (2013.01)

(52) U.S. Cl.
CPC .......... *H04L 63/1433* (2013.01); *G06F 21/50* (2013.01); *H04L 63/102* (2013.01); *H04L 63/1425* (2013.01); *H04L 63/0227* (2013.01); *H04L 63/1441* (2013.01); *H04L 63/20* (2013.01)

(58) Field of Classification Search
CPC . G06F 21/50; H04L 63/1433; H04L 63/1425; H04L 63/102; H04L 63/20; H04L 63/1441; H04L 63/0227
See application file for complete search history.

(56) References Cited

U.S. PATENT DOCUMENTS

| 7,409,382 B2 * | 8/2008 | Kido .................... G06F 16/954 |
| 8,090,678 B1 * | 1/2012 | Glickman ............. G06F 16/35 |
| | | 707/602 |
| 8,244,831 B1 * | 8/2012 | McLennan ............ H04L 67/06 |
| | | 709/217 |

(Continued)

FOREIGN PATENT DOCUMENTS

| JP | 2002-251374 | 9/2002 |
| JP | 2016-091402 | 5/2016 |
| WO | 2012/132296 | 10/2012 |

*Primary Examiner* — Don G Zhao
(74) *Attorney, Agent, or Firm* — Fujitsu Patent Center

(57) ABSTRACT

A method of network monitoring includes, acquiring a log including site information for identifying a web site that is previously accessed by an access source and content information for identifying a content that is requested by the access source, generating a first relationship information that includes site information for identifying the web site which provides the content, generating a second relationship information that includes content information for identifying another content that is requested by the access source requesting the content, generating a third relationship information that includes a second combination of the access source and the web site which provides both the content and the other content for the access source, and determining a group that includes the first combinations corresponding to the second combinations whose degree of similarity is no less than a threshold, based on the third relationship information.

11 Claims, 20 Drawing Sheets

(56) References Cited

U.S. PATENT DOCUMENTS

| | | | |
|---|---|---|---|
| 9,661,100 B2* | 5/2017 | Rao | G06F 16/972 |
| 9,779,433 B2* | 10/2017 | Baccas | G06Q 30/0282 |
| 2002/0111967 A1* | 8/2002 | Nagase | H04L 67/20 |
| | | | 715/234 |
| 2002/0116631 A1 | 8/2002 | Torii et al. | |
| 2002/0128907 A1* | 9/2002 | Sato | G06Q 30/02 |
| | | | 705/14.49 |
| 2003/0032409 A1* | 2/2003 | Hutcheson | G06Q 30/02 |
| | | | 455/414.1 |
| 2009/0157599 A1* | 6/2009 | Klinkner | G06Q 30/02 |
| 2010/0037324 A1* | 2/2010 | Grant | G06F 21/554 |
| | | | 726/27 |
| 2012/0209828 A1* | 8/2012 | Takenaka | G06F 16/254 |
| | | | 707/710 |
| 2013/0013622 A1* | 1/2013 | Elliot-McCrea | G06F 16/48 |
| | | | 707/751 |
| 2013/0097706 A1* | 4/2013 | Titonis | G06F 21/56 |
| | | | 726/24 |
| 2014/0026226 A1 | 1/2014 | Aoki et al. | |
| 2014/0149430 A1* | 5/2014 | Ryu | G06F 16/24578 |
| | | | 707/749 |
| 2016/0321345 A1* | 11/2016 | Todic | G06F 16/248 |
| 2017/0208094 A1* | 7/2017 | Hollingshead | H04L 63/20 |
| 2017/0339171 A1* | 11/2017 | Aoki | G06F 21/56 |
| 2018/0097833 A1* | 4/2018 | Saito | G06F 21/50 |
| 2018/0144003 A1* | 5/2018 | Formoso | G06K 9/6272 |
| 2018/0204111 A1* | 7/2018 | Zadeh | G06N 3/0436 |
| 2018/0314705 A1* | 11/2018 | Griffith | G06F 16/116 |
| 2019/0034491 A1* | 1/2019 | Griffith | G06F 16/2379 |
| 2019/0050445 A1* | 2/2019 | Griffith | G06K 9/6262 |

\* cited by examiner

FIG. 3

| TRANSMISSION SOURCE IP | SITE | CONTENT NAME |
|---|---|---|
| IPAddr1 | Site1 | GET:/login.php |
| IPAddr1 | Site1 | GET:/?account=1 |
| IPAddr1 | Site1 | GET:/?account=2 |
| IPAddr1 | Site2 | GET:/login.php |
| IPAddr1 | Site2 | GET:/?account=1 |
| IPAddr1 | Site3 | GET:/login.php |
| IPAddr1 | Site3 | GET:/?account=1 |
| IPAddr1 | Site3 | GET:/?account=2 |
| IPAddr2 | ... | ... |
| : | | |
| IPAddr3 | ... | ... |
| : | | |

FIG. 4

| CONTENT NAME | PROVISION SITE INFORMATION |
|---|---|
| GET:/login.php | Site1, Site2, Site3 |
| GET:/?account=1 | Site1, Site2 |
| GET:/?account=2 | Site1, Site2, Site3 |

| CONTENT NAME | ANOTHER CONTENT |
|---|---|
| GET:/login.php | GET:/?account=1, GET:/?account=2 |
| GET:/?account=1 | GET:/login.php, GET:/?account=1 |
| GET:/?account=2 | GET:/login.php, GET:/?account=2 |

| CONTENT NAME | ANOTHER CONTENT (CONTENT PAIR) | IP ADDRESS & SITE NUMBER: DETAILS (330) |
|---|---|---|
| GET:/login.php | GET:/?account=1 | 9: IPAddre1&Site1, IPAddr1&Site2, IPAddr1&Site3,··· |
| GET:/login.php | GET:/?account=2 | 6: IPAddre1&Site1, IPAddr1&Site3, IPAddr2&Site1,··· |
| GET:/?account=1 | GET:/login.php | 9: IPAddre1&Site1, IPAddr1&Site2, IPAddr1&Site3,··· |
| GET:/?account=1 | GET:/?account=2 | : |
| GET:/?account=2 | GET:/login.php | : |
| GET:/?account=2 | GET:/?account=1 | : |

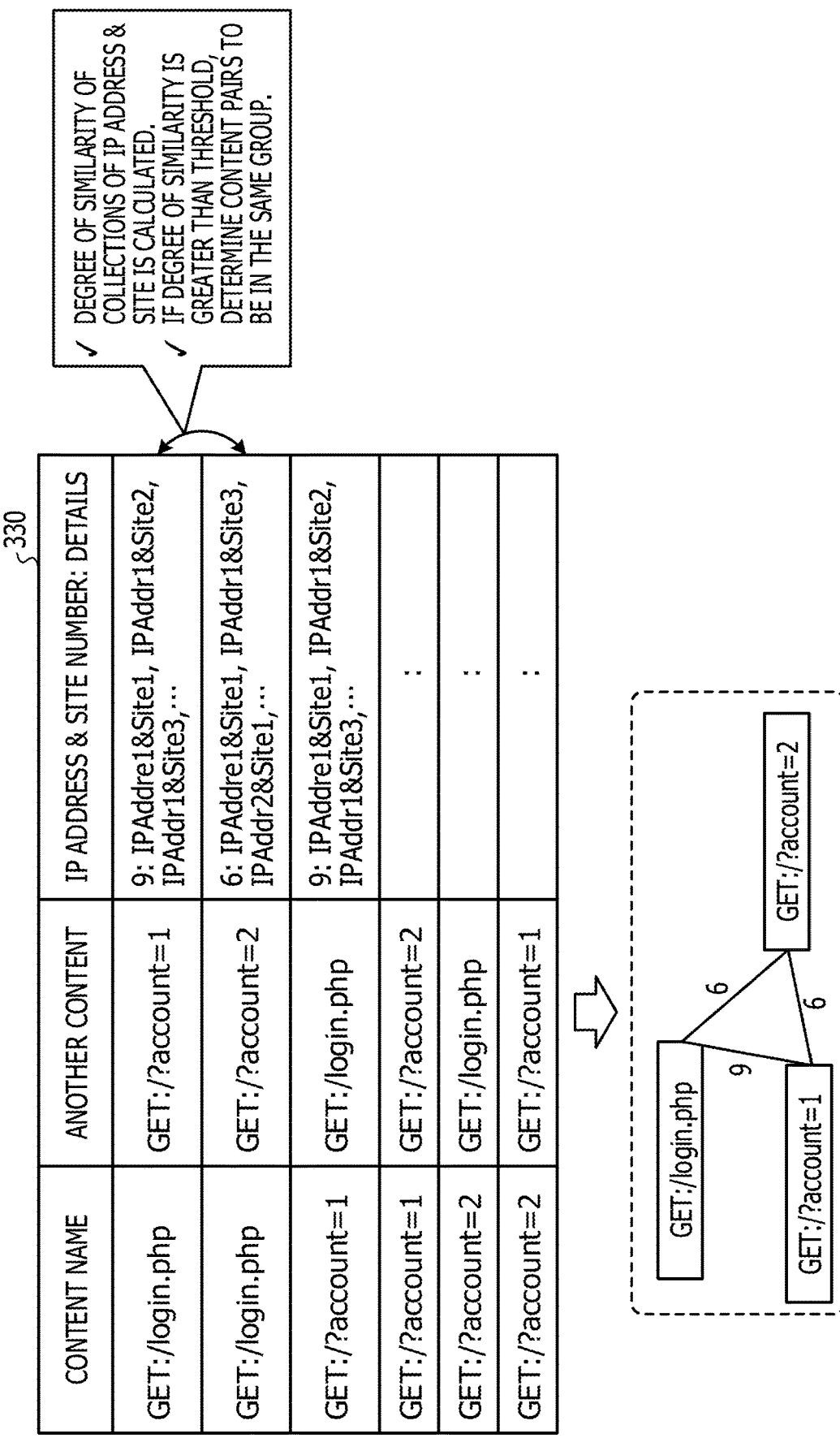

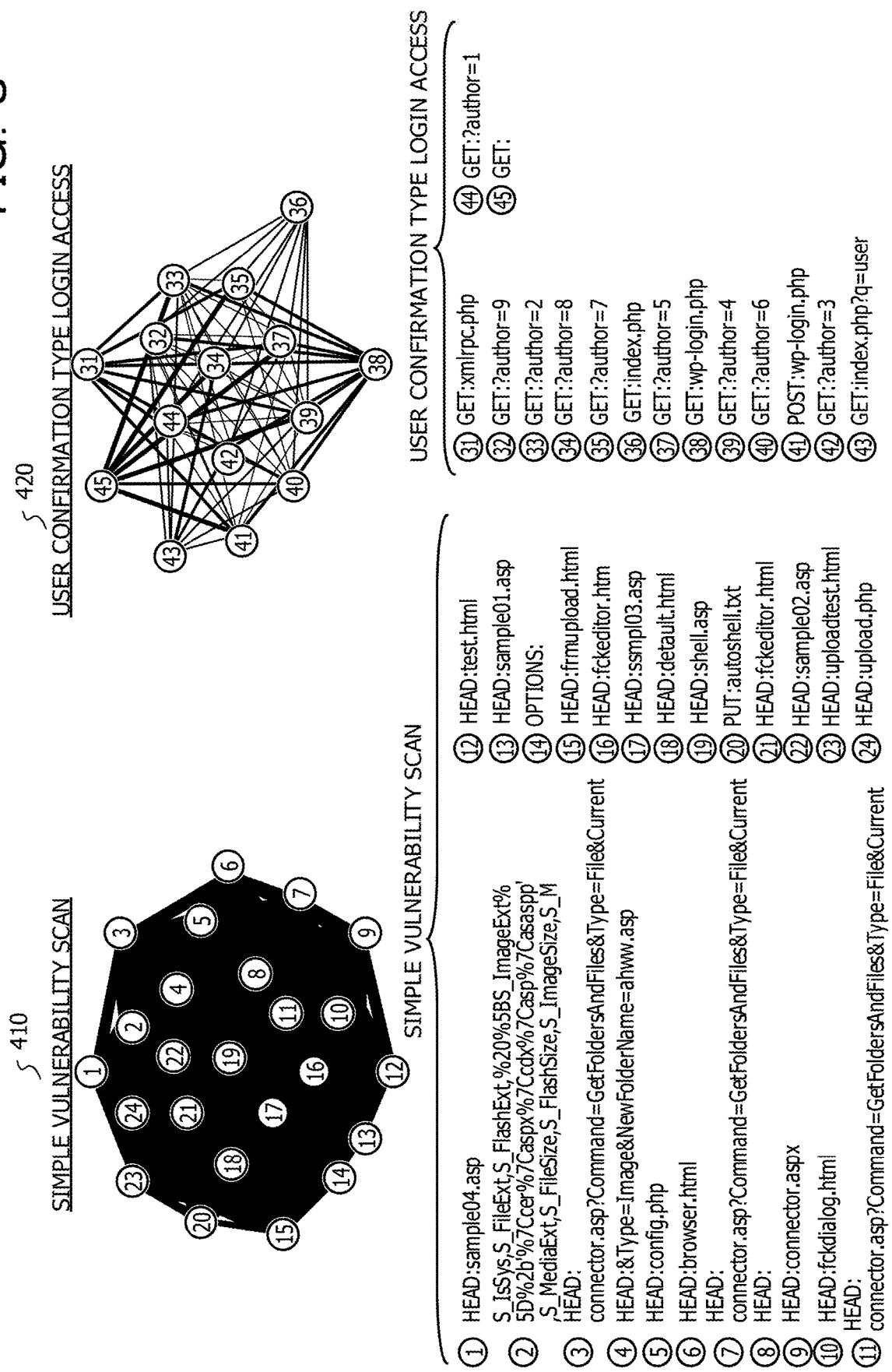

METHOD OF NETWORK MONITORING AND DEVICE

CROSS-REFERENCE TO RELATED APPLICATION

This application is based upon and claims the benefit of priority of the prior Japanese Patent Application No. 2016-195882, filed on Oct. 3, 2016, the entire contents of which are incorporated herein by reference.

FIELD

The embodiment discussed herein is related to analysis of Website attacks.

BACKGROUND

There are known cyber attacks or the like that use a computer system, the Internet or the like to illegally intrude into a target computer or a network to perform fraud, destruction, tampering or the like of data, thereby, causing the target system to malfunction.

A vulnerability scan for checking whether or not a Web site is vulnerable is known as an example of a cyber attack on a Web site on which a Web application (hereinafter, referred to as a Web app) runs. If vulnerability is found on the Web site, a cyber attacker performs fraud, destruction, tampering or the like of the data based on the vulnerability, and makes the Web site malfunction.

There is a known technology (for example, refer to Japanese Laid-open Patent Publication No. 2016-91402) in which each piece of information of an apparatus, a network, and vulnerability is applied to a predetermined algorithm based on graph theory, and a risk evaluation model for defining influence relationships of vulnerability according to an arrangement of each device on the network is created, and thereby, risk corresponding to an actual system situation is evaluated.

There is a known technology (for example, refer to Japanese Laid-open Patent Publication No. 2002-251374) in which a management manager is notified that a sign of abnormality is detected by analyzing a log, and then determines a countermeasure and a countermeasure request destination, causes the countermeasure to be performed in the countermeasure request destination, and thereby, damage due to an attack on a site is minimized.

There is a known technology (for example, refer to International Publication Pamphlet No. WO2012-132296) in which a response message including personal information among response messages corresponding to request messages is resided for a predetermined retention time, if the number of retained response messages exceeds a predetermined number, protection processing is performed, and thereby, information may be not leaked.

SUMMARY

According to an aspect of the invention, a method of network monitoring executed by a computer, includes, acquiring a log including site information for identifying a web site that is previously accessed by an access source and content information for identifying a content that is requested by the access source, for each access source, generating, for each content, a first relationship information that includes site information for identifying the web site which provides the content, based on the log, generating, for each content, a second relationship information that includes content information for identifying another content that is requested by the access source requesting the content, based on the log and the first relationship information, generating, for each first combination of the content and the other content, a third relationship information that includes a second combination of the access source and the web site which provides both the content and the other content for the access source, based on the second relationship information, and determining a group that includes the first combinations corresponding to the second combinations whose degree of similarity is no less than a threshold, based on the third relationship information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of an access log stored in a storage unit;

FIG. 4 is a diagram illustrating an example of a table generated by a first summing unit;

FIG. 5 is a diagram illustrating an example of a table generated by a second summing unit;

FIG. 6 is a diagram illustrating an example of a table generated by a third summing unit;

FIG. 7 is a diagram illustrating an example of processing of a grouping unit and a processing unit;

FIG. 8 is a diagram illustrating an example of a network graph;

DESCRIPTION OF EMBODIMENT

An attack called a multipattern type scan is emerged as one form of cyber attacks. The multipattern type scan attack has characteristics in which a plurality of contents having the same name is requested from a plurality of Internet Protocol (IP) addresses to a plurality of Web sites, and the contents are requested in accordance with a branch flow such as changing a next request according to a return value of a previous request. A technology in the related art has no effective method for extracting a malicious attack source in the multipattern type scan performed in accordance with the branch flow.

According to the present disclosure, a group of malicious accesses is extracted as a target of a multipattern type scan performed in accordance with the branch flow such as changing a next request according to a return value of a previous request. Accordingly, a network monitoring device according to the present disclosure focuses on an event in which contents having the same name are requested from logs acquired from a plurality of Web sites, regardless of transmission sources and Web sites, and creates a network graph configured by the requested contents co-occurring with the transmission source and the Web site. An analyst who monitors and analyzes a cyber attack using the network monitoring device may extract and identify a malicious access group (attack source) including a multipattern type scan according to characteristics of the created network graph.

Hereinafter, an embodiment is described in detail with reference to the drawings.

Figure 1:
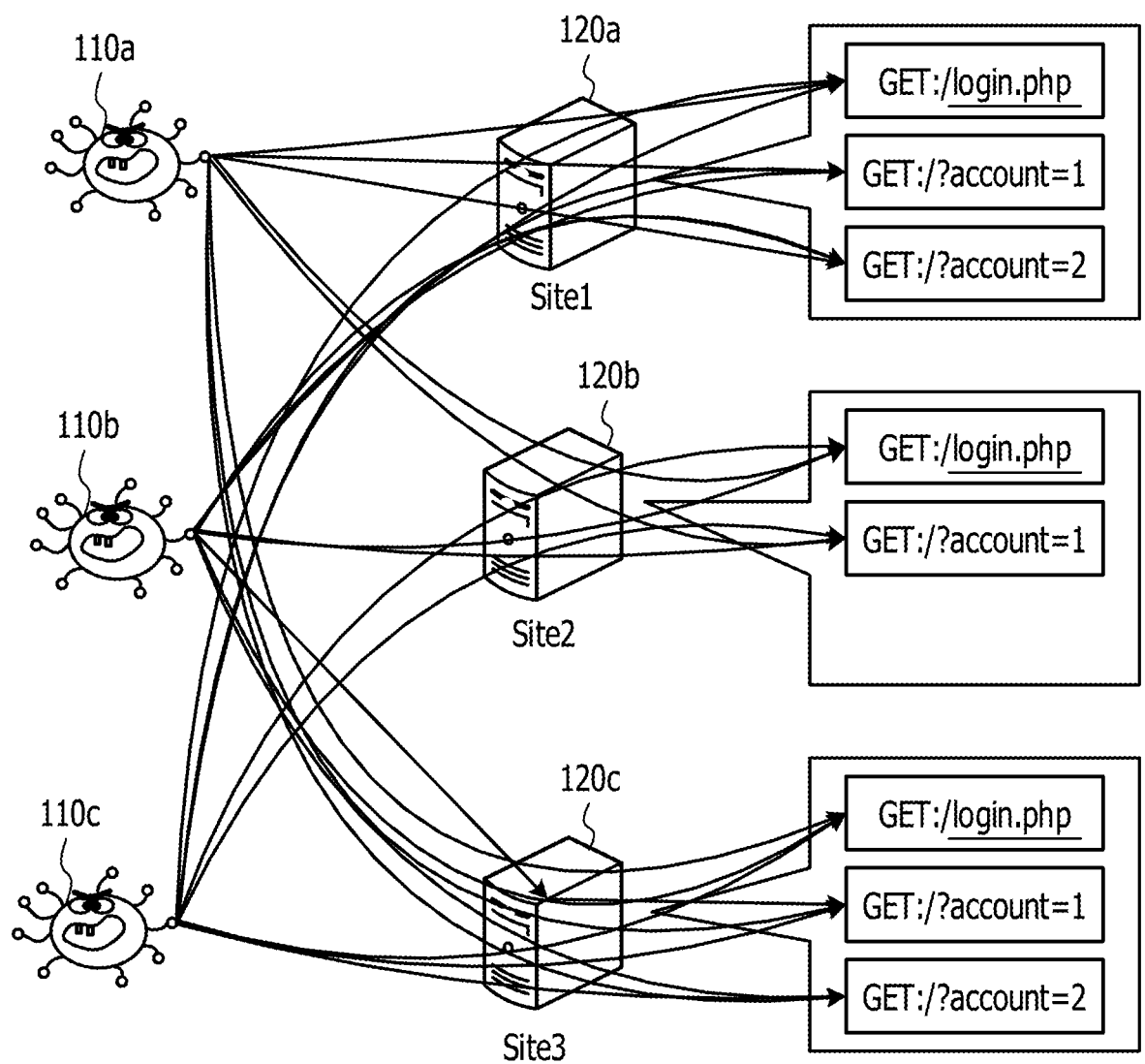
FIG. 1 is a diagram illustrating an example of a multi-pattern type scan of a user confirmation type.

FIG. 1 is a diagram illustrating an example of a multipattern type scan of a user confirmation type. A multipattern type scan attack has characteristics in which a plurality of contents having the same name are requested from a plurality of IP addresses to a plurality of Web sites, and the contents are requested following a branch flow such as changing a next request according to a return value of a previous request. In FIG. 1, attack sources 110*a* to 110*c* are a group on which the multipattern type scan is set up. Each of the attack sources 110*a* to 110*c* has different IP address. Web servers 120*a* to 120*c* operate Web sites in which Web apps operate.

The attack sources 110*a* to 110*c* transmit requests for the same contents (hereinafter, the same name contents) to the Web servers 120*a* to 120*c*. For example, the attack source 110*a* transmits "Get:/login.php" as a request for determining whether or not each of the Web servers 120*a* to 120*c* has a login function. The Web servers 120*a* to 120*c* transmit responses for the request to the attack source 110*a*. The Web servers 120*a* to 120*c* have login functions in the example of FIG. 1. As a result of the response to the request, the attack source 110*a* determines that the Web servers 120*a* to 120*c* have the login functions.

Next, the attack source 110*a* transmits "Get:/?account=1" to "Get:/?account=10" as a request for determining whether or not there exists an account for the Web servers 120*a* to 120*c*. A numeral portion of account=1 to 10 represents a user name. In other words, the attack source 110*a* inquires of the Web servers 120*a* to 120*c* whether or not there exists a user with account=1 to 10. Thereafter, the attack source 110*a* attempts to log on in a plurality of patterns (for example, 100 patterns of passwords) for each acquired user by using the acquired user name, and identifies a user name and a password which are registered in the Web site. It is assumed that the attack source 110*b* and the attack source 110*c* also perform the same processing as the attack source 110*a*. Here, a branch flow of the multipattern type scan of a user confirmation type corresponds to the branch process for determining whether or not to perform login which is a next request in accordance with the return value of the content request for confirming presence or absence of an account.

With this method, the attack source of the multipattern type scan may acquire user names and passwords from Web servers which are a plurality of attack targets, and as a result, it may be possible to perform misuse such as malfunction of a Web site, based on the acquired information.

The network monitoring device according to the present disclosure extracts and identifies a malicious access group (attack source) including the multipattern type scan.

Figure 2:
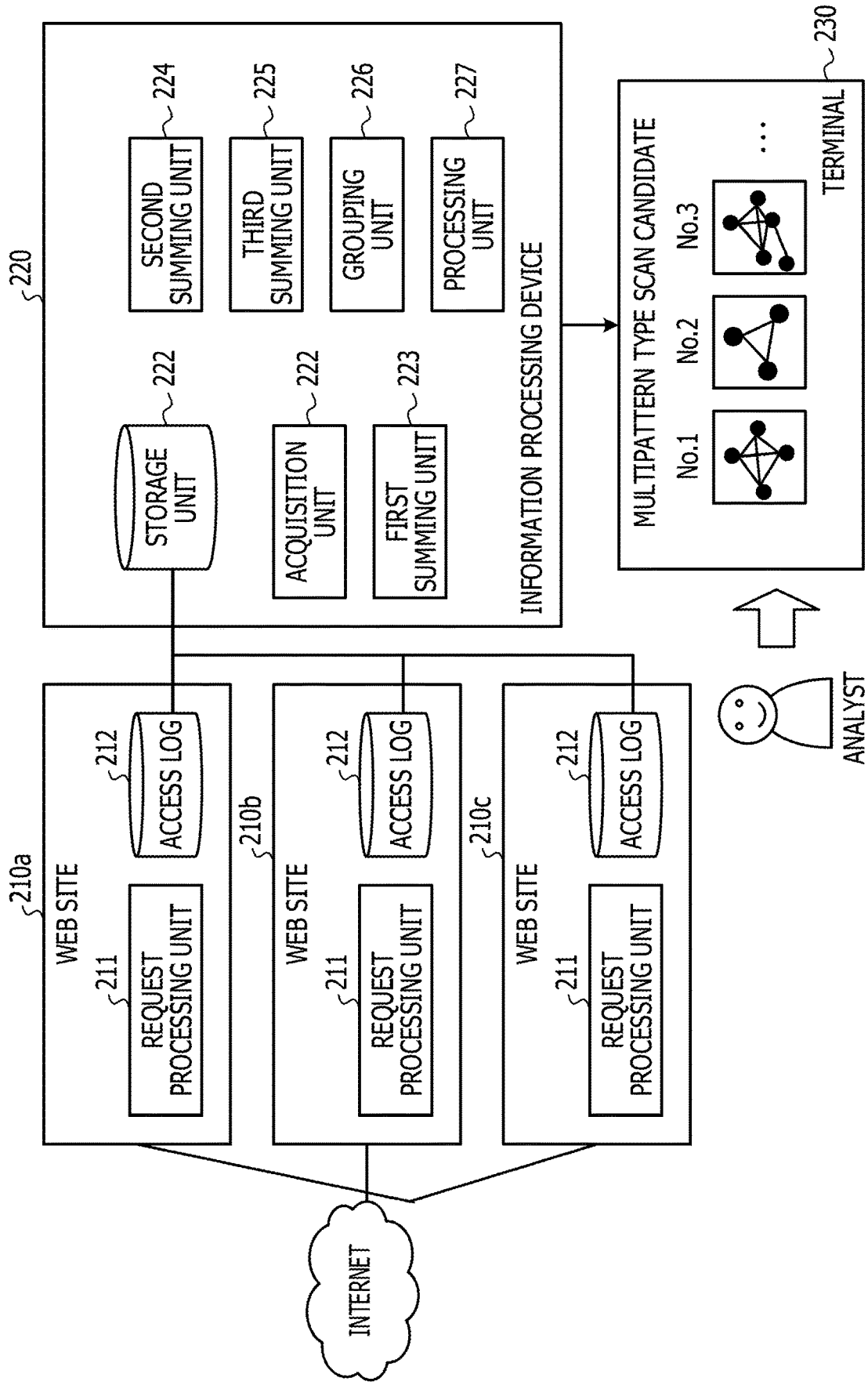
FIG. 2 is a diagram illustrating an example of a system according to the present embodiment.

FIG. 2 is a diagram illustrating an example of a system according to the present embodiment. Web sites 210 (210*a* to 210*c*) are, for example, Web sites on which Web apps are running, and receive access from a user (access source) via the Internet. A request processing unit 211 of the Web site 210 receives a request from the user (access source) and performs processing corresponding to the request. The request processing unit 211 stores access information such as information on a user and content of the request in an access log 212 in response to the request from the user.

An information processing device 220 is a network monitoring device that monitors access to the Web sites 210 (210*a* to 210*c*) which are monitoring targets. The information processing device 220 includes a storage unit 221, an acquisition unit 222, a first summing unit 223, a second summing unit 224, a third summing unit 225, a grouping unit 226, and a processing unit 227.

As in the following, processing of each unit of the information processing device 220 is described with reference to FIGS. 3 to 7.

FIG. 3 is a diagram illustrating an example of an access log stored in a storage unit. The storage unit 221 periodically collects and stores an access log 212, which relates to the access made to each of the Web sites 210, from the Web sites 210 (210*a* to 210*c*) which are monitoring targets. The storage unit 221 stores the access log 212 collected from the Web sites 210 which are monitoring targets as an access log 300.

The access log 300 includes items of transmission source IP, site, and content name. The transmission source IP is an IP address indicating an access source of a user who accesses the Web sites. The site in the access log 300 is information indicating a site of an access destination accessed by the user. In the example illustrated in FIG. 2, Site1 to Site3 correspond to, for example, the Web site 210*a* to the Web site 210*c*. The content name indicates request content (identification information for identifying content) to an access destination site when the user accesses.

For example, "IPAddr1" is stored as the transmission source IP, "Site1" is stored as the site, and "Get:/login.php" is stored as the content name, in a first line of the access log 300 in FIG. 3. In other words, this is access log information representing that the content of "Get:/login.php" is requested from an address of "IPAddr1" to "Site1".

Here, if an analyst requests analysis relating to a malicious access group (attack source) including the multipattern type scan by using a terminal 230, the information processing device 220 starts processing relating to the analysis. If the analysis processing starts, the acquisition unit 222 acquires information corresponding to the analysis request including a target period and a target Web site from the storage unit 221. Thereafter, the first summing unit 223, the second summing unit 224, the third summing unit 225, the grouping unit 226, and the processing unit 227 perform processing relating to the analysis.

FIG. 4 is a diagram illustrating an example of a table generated by the first summing unit. The first summing unit 223 performs summing processing of generating a first table 310 that stores site information for identifying a site which provides contents for each content, based on the access log 300 acquired by the acquisition unit 222 from the storage unit 221. The first table 310 includes items of content name and provision site.

In the summing processing, the first summing unit 223 extracts identification information of the content from the access log 300 and stores the identification information of contents of all types in the content name of the first table 310. The same name contents (contents having the same identification information) in the access log 300 are collectively stored in the first table 310. In the example of the first table 310, the first summing unit 223 extracts identification information of three contents "Get:/login.php", "Get:/?account=1", and "Get:/?account=2" from the access log 300.

Next, the first summing unit 223 extracts a list of provision sites that provide each content of the first table 310 (each content is requested to the provision sites), based on the access log 300, and stores in the provision site of the first table 310. In the example of the first table 310, the first summing unit 223 stores "Site1", "Site2", and "Site3" as provision sites that provide content of "Get:/login.php". The first summing unit 223 stores "Site1" and "Site2" as provision sites that provide content of "Get:/?account=1". The first summing unit 223 stores "Site1", "Site2", and "Site3" as provision sites that provide content of "Get:/?Account=2".

In the multipattern type scan, the same name contents are requested from a single access source to a plurality of sites. Accordingly, a request for a content with few sites providing the same name contents is not a request by multipattern type scan. The first summing unit 223 deletes a row of content identification information in which the number of provision sites in the first table 310 is one (or equal to or less than a predetermined threshold) from the first table 310.

FIG. 5 is a diagram illustrating an example of a table generated by the second summing unit. The second summing unit 224 performs summing processing of generating the second table 320 which stores the identification information for identifying corresponding another content requested by a content access source for each content, based on the access log 300 acquired by the acquisition unit 222 from the storage unit 221. The second table 320 includes items of content name and other contents corresponding to the content name.

In the summing processing, the second summing unit 224 acquires the identification information included in the content name of the first table 310, and stores the identification information of the same content in the content name of the second table 320. Next, the second summing unit 224 stores the identification information of other content requested from the same IP address as the transmission source IP address that requests the content for each piece of content identification information stored in the content name of the second table 320. For example, another request of "Get:/login.php" requested from the transmission source IP "IPAddr1" that requests "Get:/login.php" stored in the content name of the second table 320 is "Get:/?account=1" and "Get:/?account=2". Accordingly, the second summing unit 224 stores "Get:/?account=1" and "Get:/?account=2" in the item of other contents corresponding to the content name "Get:/login.php" of the second table 320.

FIG. 6 is a diagram illustrating an example of a table generated by the third summing unit. The third summing unit 225 performs summing processing of generating a third table 330 that stores a combination of an access source and an access destination site of each content, for each combination of contents and another content included in the second table 320. The third table 330 includes items of content name, other contents, and IP address & site number.

In the summing processing, the third summing unit 225 acquires all combinations (hereinafter, referred to as content pairs) of the identification information of a content and the identification information of another content from the second table 320, and stores the identification information of the content pair in the item of content name of the third table 330 and the item of other contents. Next, the third summing unit 225 sums a list of access sources and access destinations which request both contents (content and other content) included in the content pair, and the number of combinations of the access sources and the access destinations, for each content pair, and stores the summed items in the items of IP address and site number of the third table 330.

For example, identification information relating to the content pair of "Get:/login.php" (content name) and "Get:/?account=1" (another content) is stored in the first line of the third table 330. A combination list and the number of combinations of the access source and the access destination that request the content pair (both the content name and another content) are also stored. Here, since each of the access sources "IPAddr1", "IPAddr2", and "IPAddr3" requests "Get:/login.php" and "Get:/?account=1" to the access destinations "Site1", "Site2", and "Site3", the number of combinations of the access source and the access destination is nine. Identification information relating to the content pair of "Get:/login.php" (content name) and "Get:/?account=2" (another content) is stored in the second line of the third table 330. A combination list and the number of combinations of the access source and the access destination that request the content pair (both content name and another content) are stored in the third table 330. Here, since each of the access sources "IPAddr1", "IPAddr2", and "IPAddr3" requests both "Get:/login.php" and "Get:/?account=2" to the access destinations "Site1" and "Site3", the number of combinations of the access source and the access destination is six.

FIG. 7 is a diagram illustrating an example of processing of the grouping unit and the processing unit. The grouping unit 226 calculates a degree of similarity between the IP address (access source) and the site (access destination) included in the item of IP address & site number of the third table 330 by using Jaccard coefficient. Thereafter, the grouping unit 226 groups the combination of content pairs whose degree of similarity is greater than a predetermined threshold as a similar group that may have undergone a cyber attack by the multipattern type scan of the same type. The example of the third table 330 in FIG. 6 illustrates a cyber attack in which all the access sources and access destinations (requesting the same contents) belong to the multipattern type scan of the same type.

The processing unit 227 creates network-graph of IP addresses and site numbers which belong to a similar group. In the network graph, each point represents identification information for identifying the content. Thicknesses of lines connecting each point are determined based on the number of combinations of the access source and the access destination. In the example of FIG. 7, each points are "Get:/login.php", "Get:/?account=1", and "Get:/?account=2". A thickness of a line connecting two points is determined based on the number of combinations extracted from the third table 330 for the content pair corresponding to the two points of both ends of the line.

FIG. 8 is a diagram illustrating an example of the network graph. A graph 410 is an example of a case where a simple vulnerability scan is graphed. In the graph 410, all contents and lines (the number of accesses) connecting each content are visualized. Accordingly, even if an analyst checks the graph 410, it is hard to analyze how a cyber attack is performed.

Meanwhile, a graph 420 generated by the information processing device 220 according to the present embodiment is obtained by graphing a cyber attack belonging to a multipattern type scan of a similar type (the same contents are requested) in which the access source and the access destination are similar. By viewing a thickness of a line of the graph 420, an analyst may confirm content (point) and the number of accesses (lines) where the access is concentrated or variation of the accesses, and may analyze the contents, the number of accesses, and the like where the cyber attack is actually performed. In addition, since the graph 420 graphs the cyber attack which requests the same content, access concentration is easily analyzed as compared with the graph 410. The processing unit 227 generates the graph 420 for each similar group. The analyst checks the graph 420 of each similar group by using the terminal 230, thereby being able to confirm the similar group which is a candidate of the cyber attack. The information processing device 220 may include a display unit which displays the graph 420 of each similar group.

As described above, the network monitoring device according to the embodiment of the present disclosure extracts an attack method, an access source, and a combination of similar destinations, from the logs including the identification information of the access source, the access destination, and the requested content, and graphs the extracted information, and thereby helping the analyst to analyze the cyber attack. Although the multipattern type scan according to the present embodiment exemplifies a user confirmation type, each content is not limited to the user confirmation type.

Figure 9:
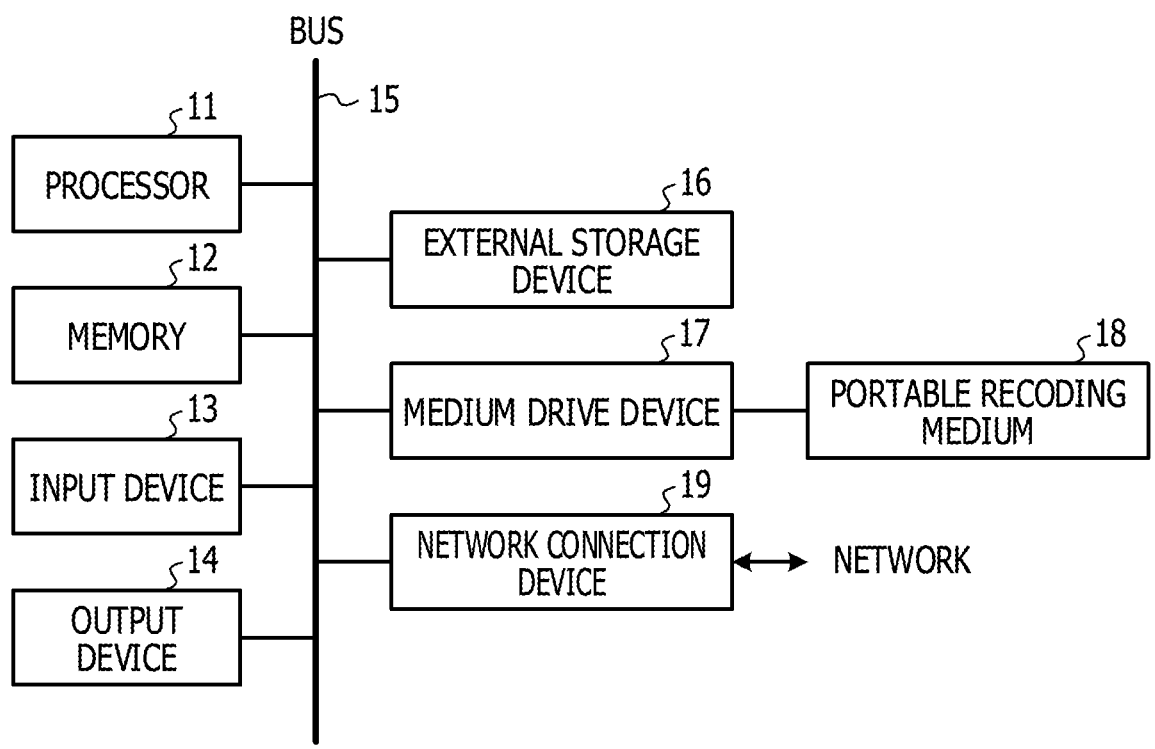
FIG. 9 is a diagram illustrating an example of a hardware configuration of an information processing device according to the present embodiment.

FIG. 9 is a diagram illustrating an example of a hardware configuration of the information processing device according to the present embodiment. The information processing device 220 includes a processor 11, a memory 12, a bus 15, an external storage device 16, and a network connection device 19. Furthermore, the information processing device 220 may include an input device 13, an output device 14, and a medium drive device 17 as options. The information processing device 220 may be realized by, for example, a computer or the like.

The processor 11 may be an arbitrary processing circuit including a central processing unit (CPU). The processor 11 operates as the acquisition unit 222, the first summing unit 223, the second summing unit 224, the third summing unit 225, the grouping unit 226, and the processing unit 227. The processor 11 may execute, for example, a program stored in the external storage device 16. The memory 12 operates as the storage unit 221 and stores the access log 300 collected from each Web site, the first table 310, the second table 320, and the third table 330. Furthermore, the memory 12 also stores data obtained by an operation of the processor 11 and data used for processing of the processor 11, as appropriate. The network connection device 19 is used for communication with the Web site 210 and other devices such as the terminal 230.

The input device 13 is realized as, for example, a button, a keyboard, a mouse, and the like, and the output device 14 is realized as a display or the like. The bus 15 connects the processor 11, the memory 12, the input device 13, the output device 14, the external storage device 16, the medium drive device 17, and the network connection device 19 such that data may be mutually exchanged. The external storage device 16 stores a program, data, and the like, and provides the stored information to the processor 11 and the like as appropriate. The medium drive device 17 may output data of the memory 12 and the external storage device 16 to a portable storage medium 18, and may read programs, data, and the like from the portable storage medium 18. Here, the portable storage medium 18 may be an arbitrary portable storage medium including a floppy disk, a magnet-optical (MO) disk, a compact disc recordable (CD-R) and a digital versatile disc recordable (DVD-R).

Figure 10:
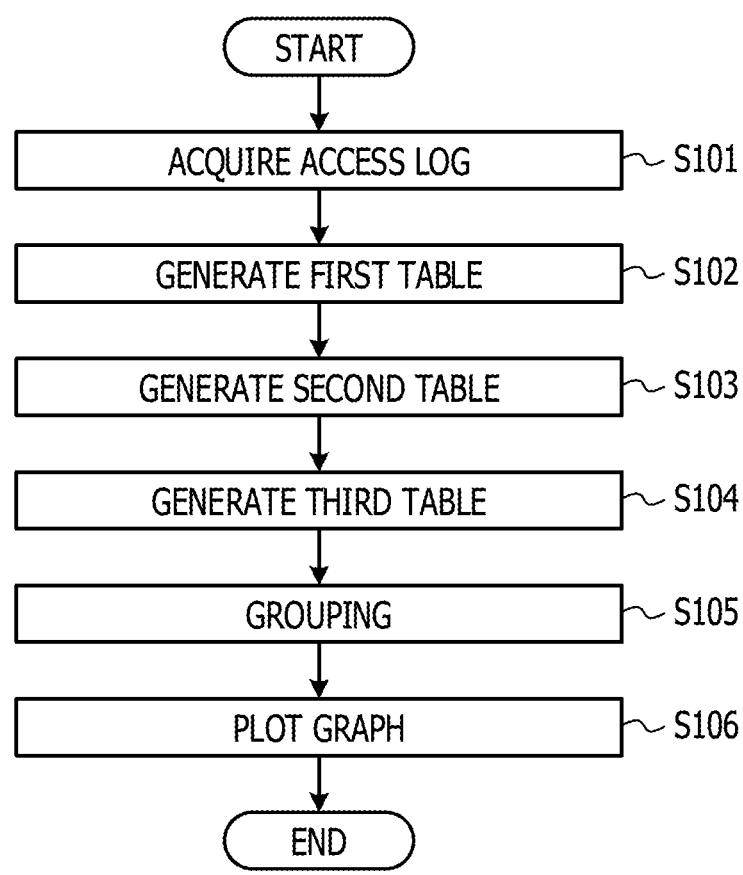
FIG. 10 is a flowchart illustrating an example of processing of the information processing device according to the present embodiment.

FIG. 10 is a flowchart illustrating an example of processing of the information processing device according to the present embodiment. The acquisition unit 222 acquires the access log 300 from the storage unit 221 (step S101). The first summing unit 223 performs summing processing of generating the first table 310 which stores site information for identifying a content provision site for each content (step S102). The second summing unit 224 performs summing processing of generating the second table 320 which stores content information for identifying corresponding another content requested by a content access source for each content (step S103). The third summing unit 225 performs summing processing of generating the third table 330 which stores a site combination of an access source and an access destination site of a content pair for each combination (content pair) of content and corresponding another content (step S104). The grouping unit 226 groups the content pairs including a combination of similar access source and access destination site (step S105). The processing unit 227 graphs the grouped content pairs (step S106). Thereafter, the terminal 230 displays the graph on a display unit.

Figure 11A:
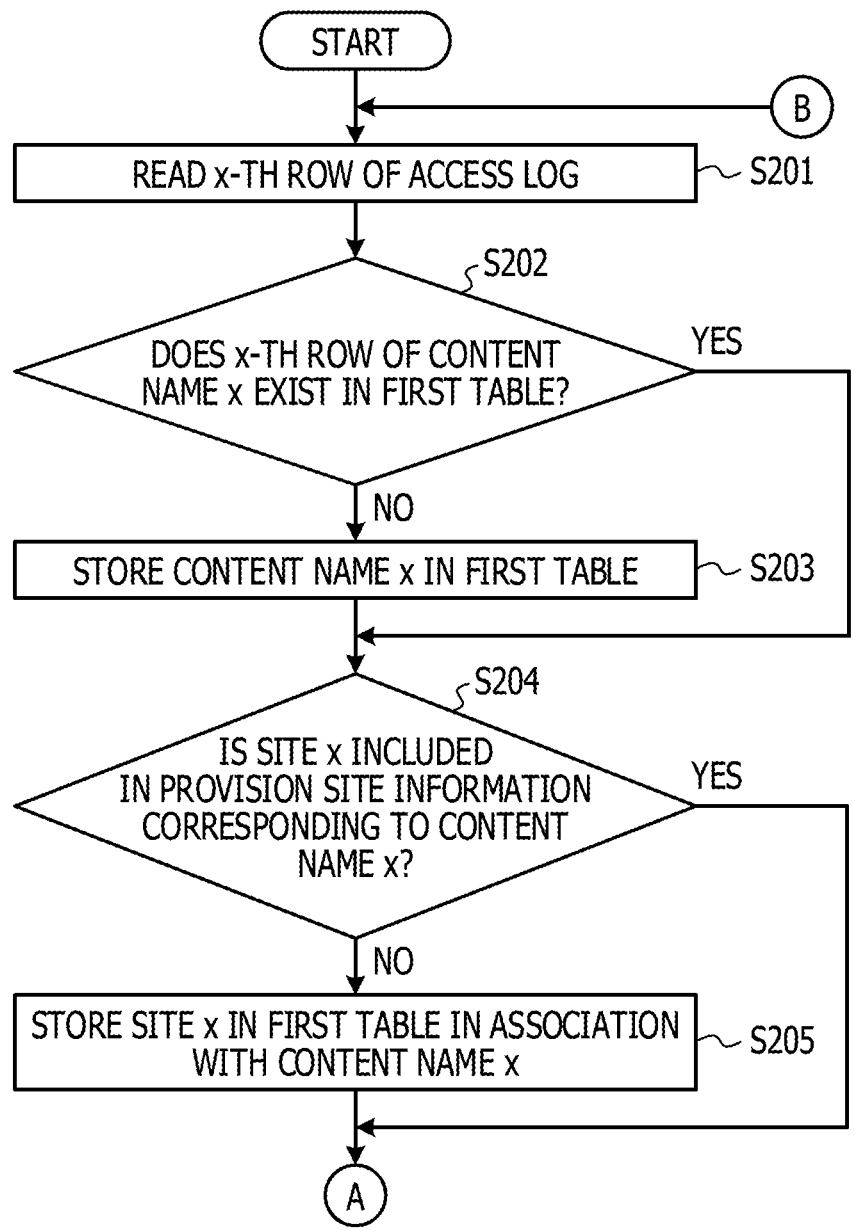
FIG. 11A is a flowchart illustrating an example of processing of the first summing unit.
Figure 11B:
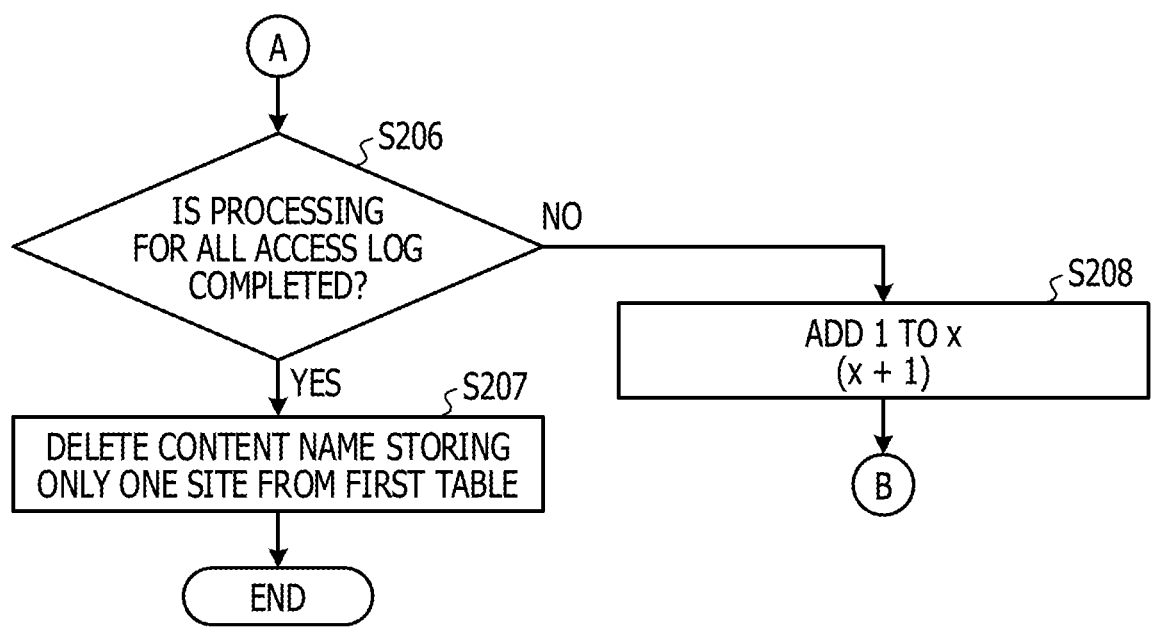
FIG. 11B is a flowchart illustrating the example of the processing of the first summing unit.

FIGS. 11A and 11B are flowcharts illustrating an example of processing of the first summing unit. FIGS. 11A and 11B are flowcharts illustrating the processing of step S102 in FIG. 10 in more detail. The first summing unit 223 acquires an x-th row of the access log 300 (step S201). Here, x in FIGS. 11A and 11B is assumed to be a variable representing a row in the access log 300. In addition, it is assumed that a site x and a content name x are stored in the access log 300 of the x-th row.

The first summing unit 223 determines whether or not the content name x of the read x-th row is already included in the first table 310 (step S202). In a case where the content name x is not included in the first table 310 (NO in step S202), the first summing unit 223 stores the content information for identifying the content name x in the item of content name in the first table 310 (step S203).

After the processing of step S203 is completed or in a case where the content name x is included in the first table 310 (YES in step S202), the first summing unit 223 determines whether or not the provision site information corresponding to the content name x in the first table 310 includes information for identifying the site x (step S204). In a case where the provision site information corresponding to the content name x in the first table 310 does not include the information for identifying the site x (NO in step S204), the first summing unit 223 stores the site information for identifying the site x in the provision site information corresponding to the content name x (step S205).

After the processing of step S205 is completed or in a case where the information for identifying the site x is included in the provision site information corresponding to the content name x in the first table 310 (YES in step S204), the first summing unit 223 determines whether or not the processing of steps S201 to S205 for all the rows of the access log 300 (step S206) is completed. In a case where the processing for all the rows of the access log 300 is not completed (NO in step S206), the first summing unit 223 adds 1 to the variable x (step S208). Thereafter, the first summing unit 223 repeats the processing from step S201 to step S206 using a variable x+1.

In a case where the processing for all the rows of the access log 300 is completed (YES in step S206), the first summing unit 223 deletes the content name for which only one site is stored in the item of the provision site information in the first table 310, from the first table 310 (step S207). If the processing of step S207 is completed, the first summing unit 223 ends the processing.

Figure 12A:
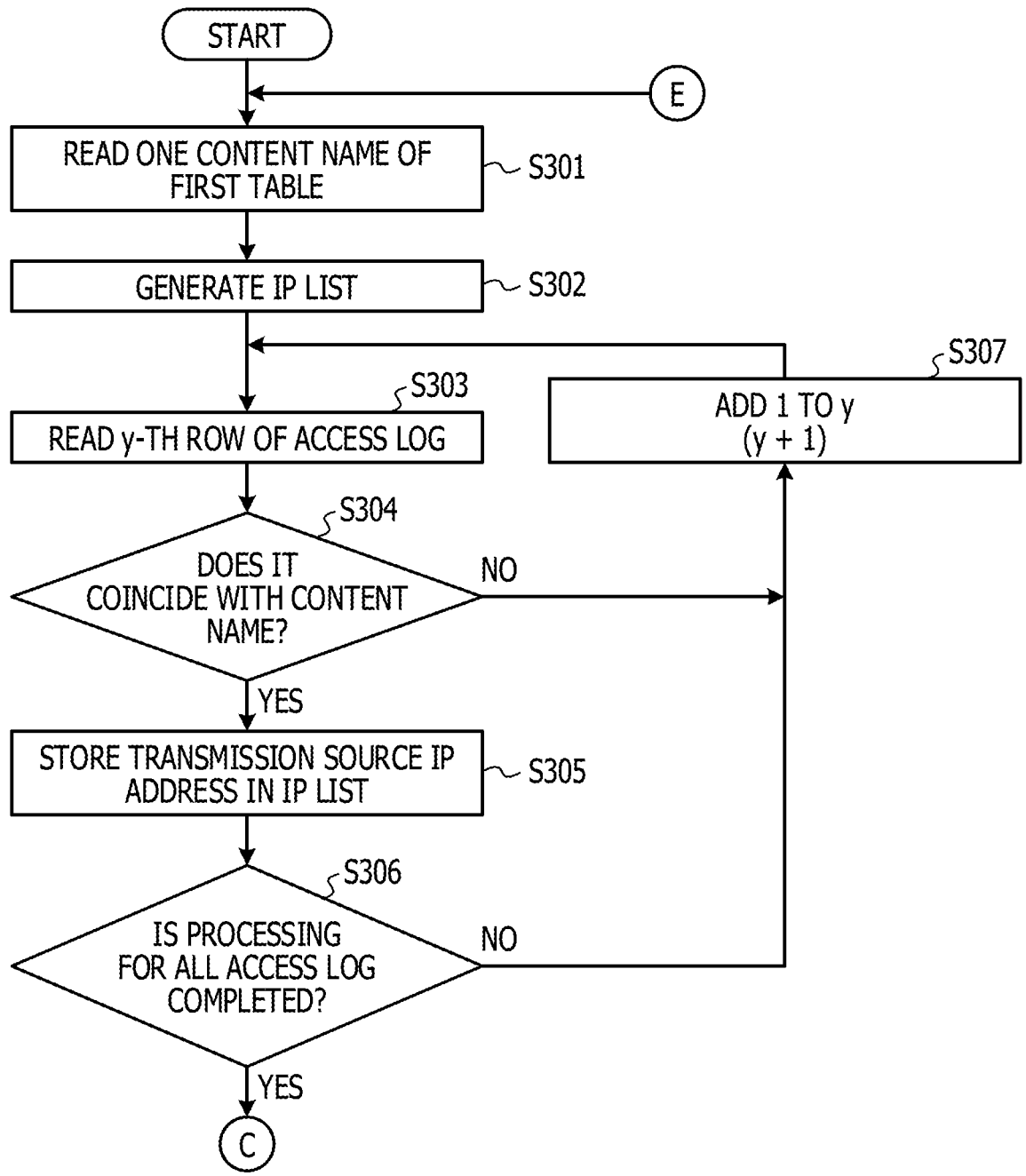
FIG. 12A is a flowchart illustrating an example of processing of the second summing unit.
Figure 12B:
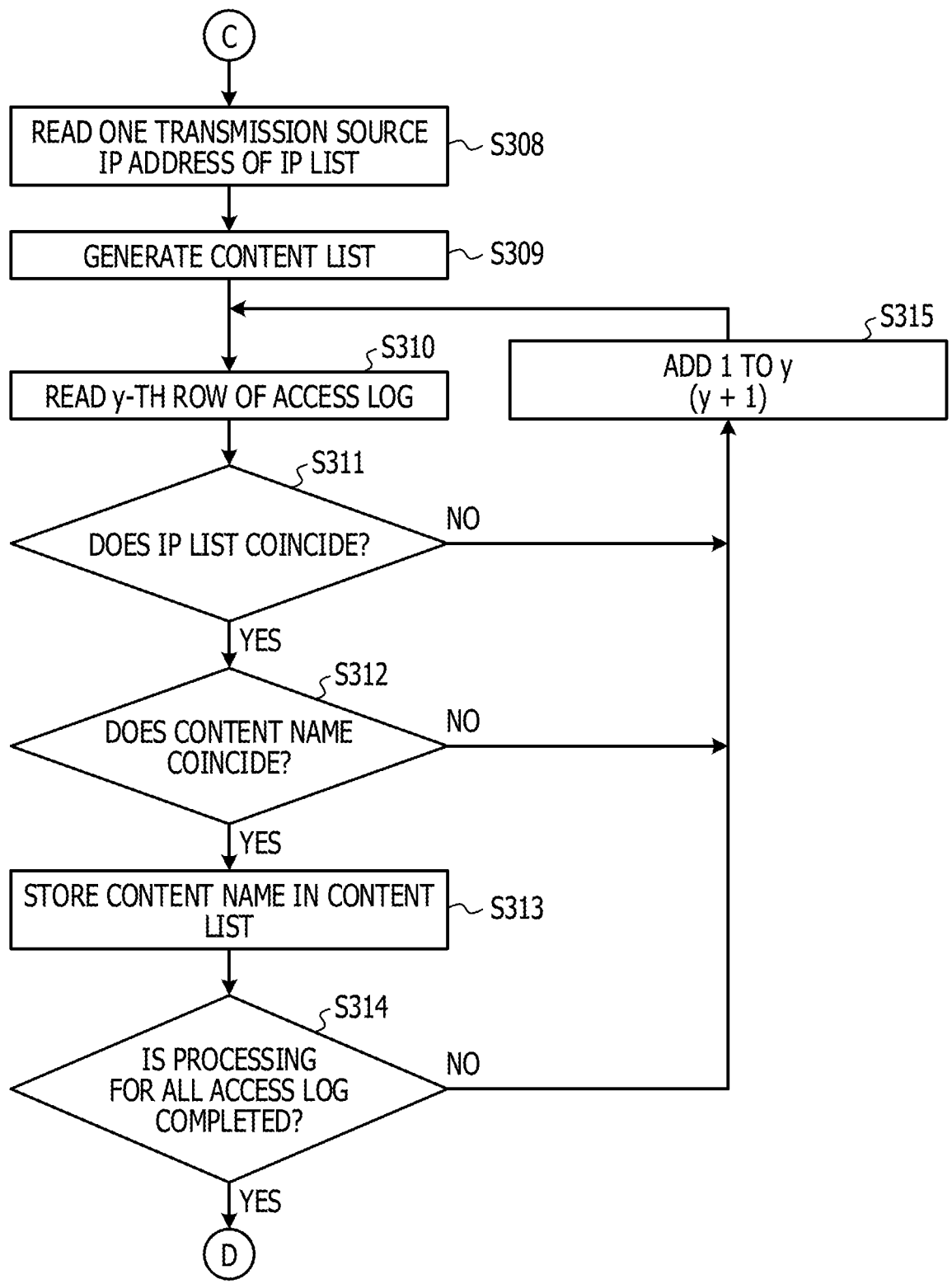
FIG. 12B is a flowchart illustrating the example of the processing of the second summing unit.
Figure 12C:
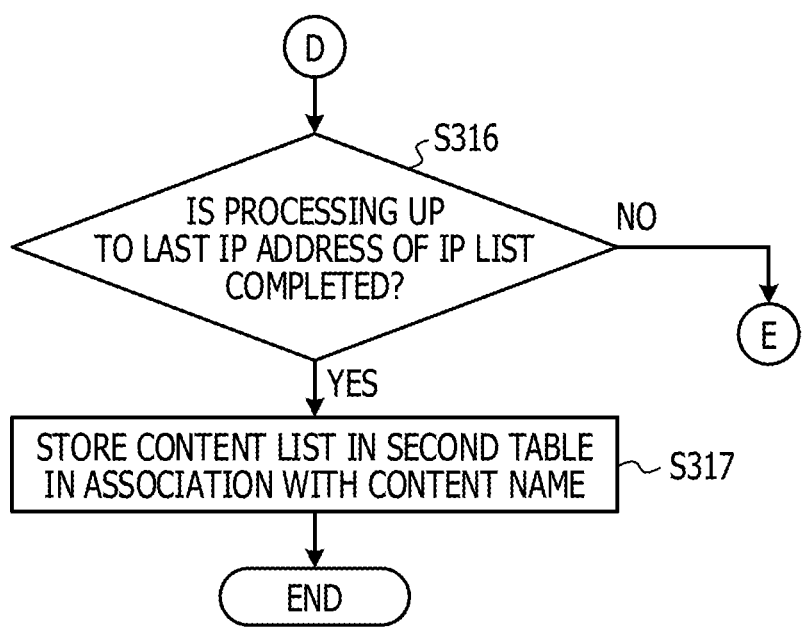
FIG. 12C is a flowchart illustrating the example of the processing of the second summing unit.

FIGS. 12A to 12C are flowcharts illustrating an example of processing of the second summing unit. FIGS. 12A to 12C are flowcharts illustrating the processing of step S103 in FIG. 10 in more detail. The second summing unit 224 acquires one content name in the first table 310 (step S301). The second summing unit 224 generates an IP list for temporarily storing transmission source IP addresses (step S302).

The second summing unit 224 acquires a y-th row of the access log 300 (step S303). Here, y in FIGS. 12A to 12C is assumed to be a variable representing a row in the access log 300. In addition, it is assumed that a site y and a content name y are stored in the access log 300 of the y-th row. The second summing unit 224 determines whether or not the content name read in step S301 coincides with the content name y (step S304). In a case where the content name read in step S301 coincides with the content name y (YES in step S304), the second summing unit 224 stores the transmission source IP address of the access log of the y-th row in the IP list (step S305). The second summing unit 224 determines whether or not the processing of steps S303 to S305 for all the rows of the access log is completed (step S306). If the content name read in step S301 does not coincide with the content name y (NO in step S304), or in a case where the processing for all the rows of the access log is not completed (NO in step S306), the second summing unit 224 adds 1 to the variable y (step S307). Thereafter, the second summing unit 224 repeats the processing from step S303 to step S306 using a variable y+1.

In a case where the processing for all the rows of the access log is completed (YES in step S306), the second summing unit 224 acquires one transmission source IP address included in the IP list (step S308). The second summing unit 224 generates a content list that temporarily stores the content name (step S309).

The second summing unit 224 acquires the y-th row of the access log 300 (step S310). Here, the variable y in step S310 is the same variable as in step S303. The second summing unit 224 determines whether or not the transmission source IP address read in step S308 coincides with the transmission source IP address in the y-th row of the access log 300 (step S311). In a case where the transmission source IP address read in step S308 coincides with the transmission source IP address in the y-th row of the access log 300 (YES in step S311), the second summing unit 224 determines whether or not the content name read in step S301 coincides with the content name y of the y-th row of the access log 300 (step S312). In a case where the content name read in step S301 coincides with the content name y in the y-th row of the access log 300 (YES in step S312), the second summing unit 224 stores the content name y in the content list (step S313). The second summing unit 224 determines whether or not the processing of steps S310 to S313 for all the rows of the access log is completed (step S314). In a case where the transmission source IP address read in step S308 does not coincide with the transmission source IP address of the y-th row of the access log 300 (NO in step S311), in a case where the content name read in step S301 does not coincide with the content name y of the y-th row of the access log 300 (NO in step S312), or in a case where the processing for all the access logs is not completed (NO in step S314), the second summing unit 224 adds 1 to the variable y (step S315). Thereafter, the second summing unit 224 repeats the processing from steps S310 to S314 using a variable y+1.

In a case where the processing for all the access logs is completed (YES in step S314), the second summing unit 224 determines whether or not the processes of steps S310 to S314 is completed up to the last transmission source IP address included in the IP list (step S316). In a case where the processing is not completed up to the last transmission source IP address included in the IP list (NO in step S316), the second summing unit 224 repeats the processing from step S301. A content name different from the previous content name is acquired in step S301. In a case where the processing for all the last transmission source IP addresses included in the IP list is completed (YES in step S316), the second summing unit 224 stores the content list in the second table 320 in association with the content name read in step S301 (step S317). If the processing of step S317 is completed, the second summing unit 224 ends the processing.

Figure 13A:
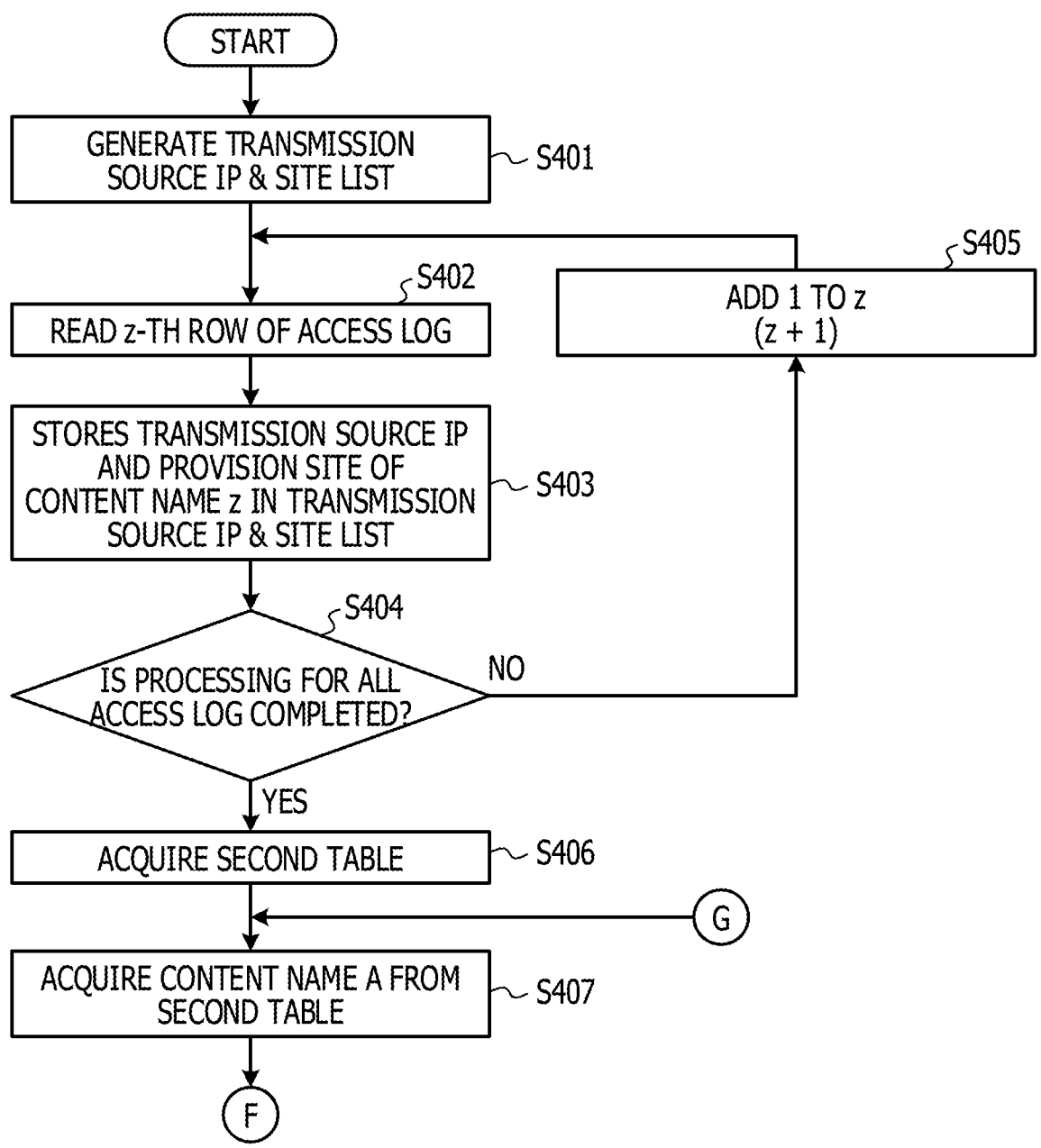
FIG. 13A is a flowchart illustrating an example of processing of the third summing unit.
Figure 13B:
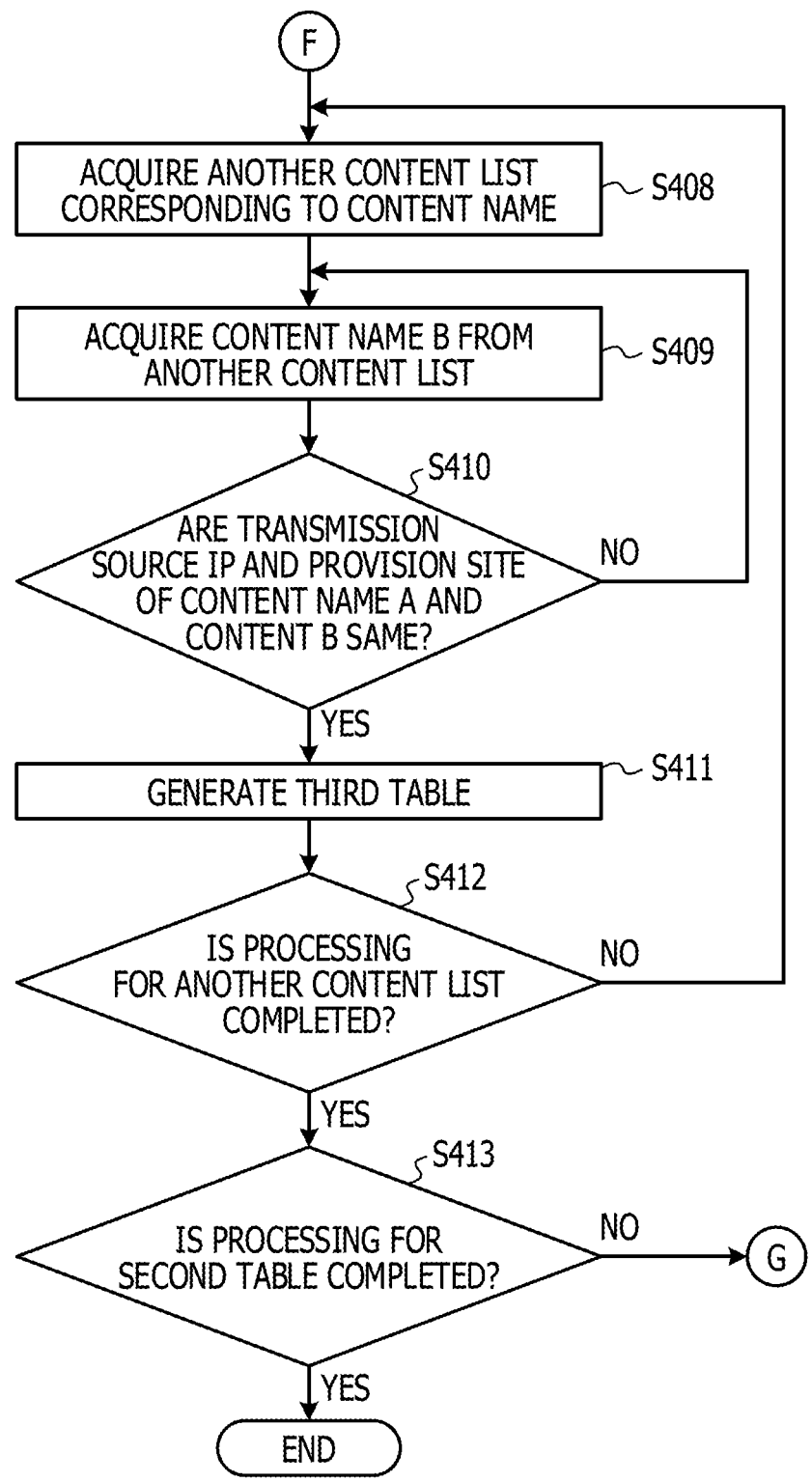
FIG. 13B is a flowchart illustrating the example of the processing of the third summing unit.

FIGS. 13A and 13B are flowcharts illustrating an example of processing of the third summing unit. FIGS. 13A and 13B are flowcharts illustrating the processing of step S104 in FIG. 10 in more detail. The third summing unit 225 generates a transmission source IP & site list that temporarily stores the transmission source IP & sites (step S401).

The third summing unit 225 acquires a z-th row of the access log 300 (step S402). Here, z in FIGS. 13A and 13B is assumed to be a variable representing a row in the access log 300. In addition, it is assumed that a site z and a content name z are stored in the access log 300 of the z-th row. The third summing unit 225 stores a transmission source IP and a provision site of the content name z in a transmission source IP & site list (step S403). The third summing unit 225 determines whether or not the processing of steps S402 to S403 for all the rows of the access log is completed (step S404). If the processing for all the access logs is not completed (NO in step S404), the third summing unit 225 adds 1 to the variable z (step S405). Thereafter, the third summing unit 225 repeats the processing from steps S402 to S404 using a variable z+1.

In a case where the processing for all the access logs is completed (YES in step S404), the third summing unit 225 acquires the second table 320 (step S406). The third summing unit 225 acquires one content name A from the second table 320 (step S407). The third summing unit 225 acquires other contents (hereinafter, referred to as other contents list) corresponding to the content name A acquired in step S407 (step S408). The third summing unit 225 acquires one content name B from other contents list (step S409). The third summing unit 225 determines whether or not the transmission source IP addresses and the provision sites corresponding to the content name A and the content name B are the same as each other (step S410). If the transmission source IP addresses and the provision sites corresponding to the content name A and the content name B are not the same (NO in step S410), the third summing unit 225 repeats the processing from step S409.

In a case where the transmission source IP addresses and the provision site corresponding to the content name A and the content name B are the same (YES in step S410), the third summing unit 225 sets the content name A and the content B as a content pair, and stores the transmission source IP & site corresponding to the content pair in the third table 330 (step S411). The third summing unit 225 determines whether or not all the content names in other contents list are acquired (step S412). In a case where all the content names B in other contents list are not acquired (NO in step S412), the third summing unit 225 repeats the processing from step S408. In a case where all the content names B in other contents list are acquired (YES in step S412), the third summing unit 225 determines whether or not all the content names A are acquired from the second table 320 (step S413). In a case where all the content names A are not acquired from the second table 320 (NO in step S413), the third summing unit 225 repeats the processing from step S407. In a case where all the content names A are acquired from the second table 320 (YES in step S413), the third summing unit 225 ends the summing processing.

Figure 14A:
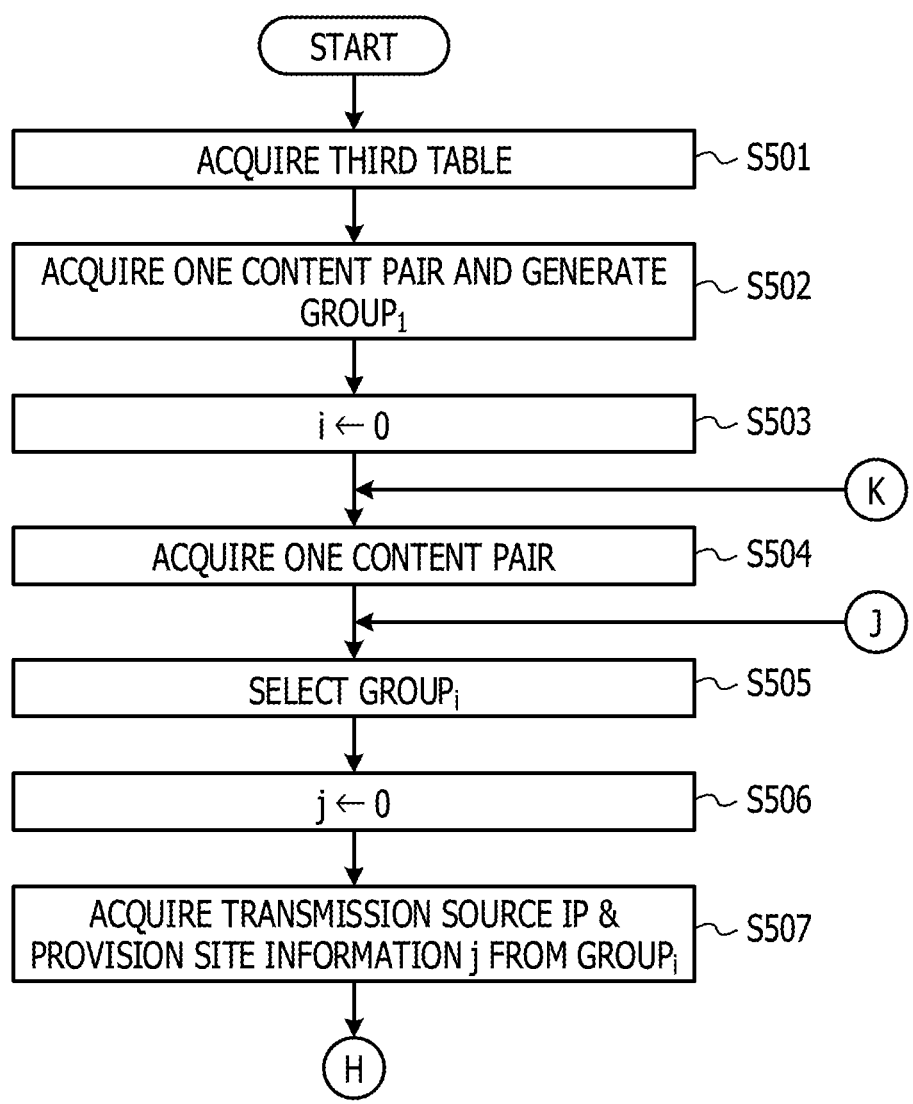
FIG. 14A is a flowchart illustrating an example of processing of the grouping unit.
Figure 14B:
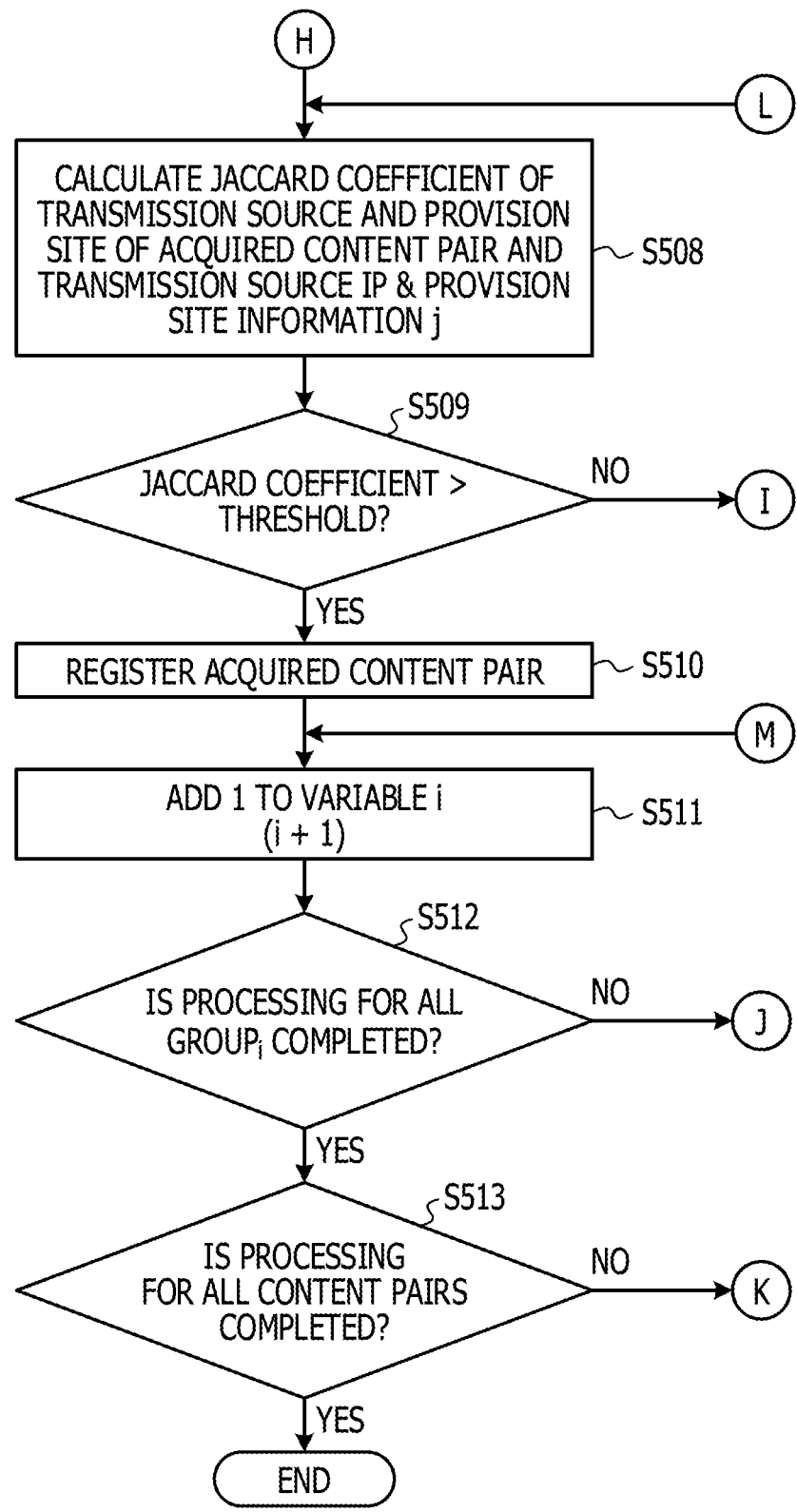
FIG. 14B is a flowchart illustrating the example of the processing of the grouping unit.
Figure 14C:
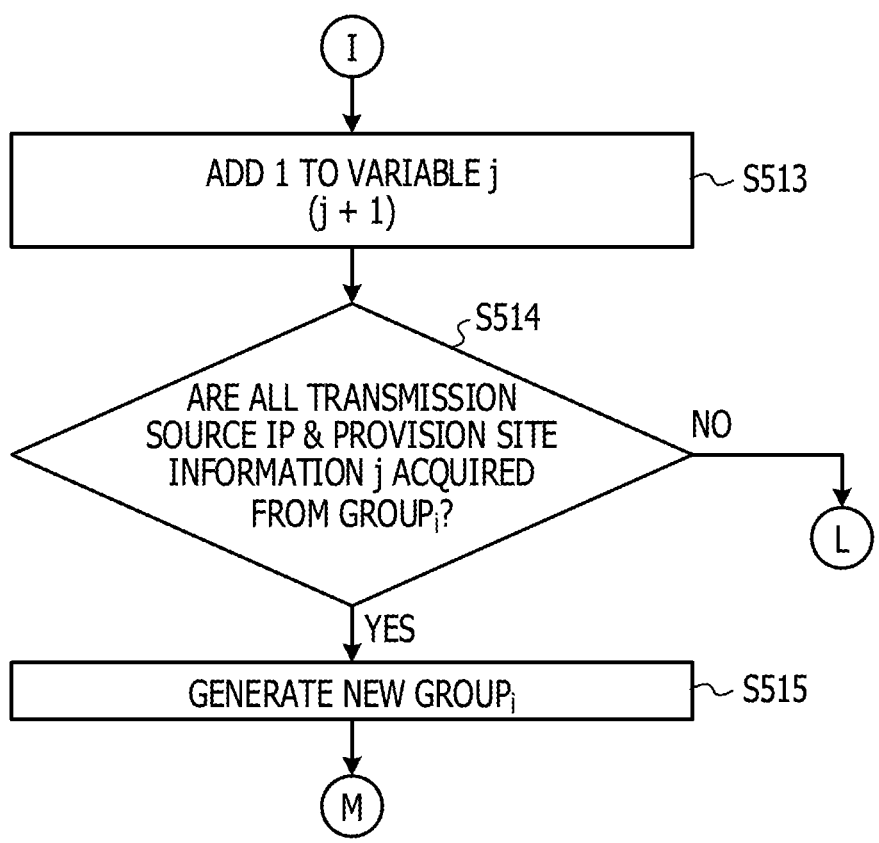
FIG. 14C is a flowchart illustrating the example of the processing of the grouping unit.

FIGS. 14A to 14C are flowcharts illustrating an example of processing of the grouping unit. FIGS. 14A to 14C are flowcharts illustrating the processing of step S105 in FIG. 10 in more detail. The grouping unit 226 acquires the third table 330 (step S501). The grouping unit 226 arbitrarily acquires one content pair from the third table 330, and generates a group$_{i=1}$ including one element (step S502). The grouping unit 226 sets 0 as a variable i for identifying groups (step S503). Here, the variable i in FIGS. 14A to 14C is used for identifying the groups, and it is assumed that the same number of variable i as the groups exist.

The grouping unit 226 acquires one content pair from the third table 330 (step S504). The grouping unit 226 selects the group, (step S505). The grouping unit 226 sets 0 as a variable j (step S506). Here, the variable j in FIGS. 14A to 14C is used for identifying a combination (hereinafter, referred to as transmission source IP & provision site information j) of transmission source IP and provision site information which is included in the group$_i$, and the same number of variable j as the combinations of the transmission source IP and the provision site information exist. The grouping unit 226 acquires the transmission source IP & provision site information j from the group, (step S507). The grouping unit 226 calculates Jaccard coefficient of the transmission source and the provision site of the content pair acquired in step S504 and the transmission source IP & provision site information j (step S508). The grouping unit 226 determines whether or not the Jaccard coefficient is greater than or equal to a predetermined threshold (step S509).

In a case where the Jaccard coefficient is greater than or equal to the predetermined threshold (YES in step S509), the grouping unit 226 registers the content pair acquired in step S504 in group, (step S510). The grouping unit 226 adds 1 to the variable i (step S511). The grouping unit 226 determines whether or not the processing for all the groups is completed (step S512). In a case where the processing for all the groups is not completed (NO in step S512), the grouping unit 226 repeats the processing from step S505.

In a case where the Jaccard coefficient is less than the predetermined threshold (NO in step S509), the grouping unit 226 adds 1 to the variable j (step S513). The grouping unit 226 determines whether or not all the transmission source IP & provision site information j are acquired from the group, (step S514). In a case where all the transmission source IP & provision site information j are not acquired from group, (NO in step S514), the grouping unit 226 repeats the processing from step S508. In a case where all the transmission source IP & provision site information j are acquired from the group, (YES in step S514), the grouping unit 226 adds a new group (step S515). If the processing of step S515 is completed, the grouping unit 226 performs the processing of step S511.

In a case where the processing for all the groups is completed (YES in step S512), the grouping unit 226 determines whether or not all the content pairs are acquired from the third table 330 (step S516). In a case where all the content pairs are not acquired from the third table 330 (NO in step S516), the grouping unit 226 repeats the processing from step S504. In step S504, a content pair different from the previous content pair is acquired and the next processing is performed. In a case where all the content pairs are acquired from the third table 330 (YES in step S516), the grouping unit 226 ends the processing.

As described above, the network monitoring device according to the embodiment of the present disclosure extracts an attack method, an access source, and a combination in which destinations are similar, from a log including an access source, an access destination, and identification information of a requested content, and graphs the extracted items, and thereby helping an analyst to analyze the cyber attack. Although the multipattern type scan according to the present embodiment exemplifies a user confirmation type, each content is not limited to the user confirmation type.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of network monitoring executed by a computer, the method comprising:
    acquiring a log including site information for identifying each web site of a plurality of web sites that is previously accessed by each of access sources and content information for identifying each of the contents that is requested to each of the web sites by each of the access sources;
    generating first combinations of a first content and a second content from the contents;
    generating, for each of the first combinations, second combinations of the access source and the web site which provides both the first content and the second content for the access source;
    determining degree of similarity by comparing each of the second combinations corresponding to each of the first combinations; and
    determining a group that includes the first combinations corresponding to the second combinations whose degree of similarity is no less than a threshold.

2. The method of network monitoring according to claim 1, the method further comprising: graphing the first combination included in the group on a graph.

3. The method of network monitoring according to claim 2, wherein the first content and the second content are connected with a line in the graph, a thickness of the line being based on a number of the second combination.

4. The method of network monitoring according to claim 1, wherein the degree of similarity of the second combination is calculated based on Jaccard coefficient.

5. The method of network monitoring according to claim 1, wherein the access source is identified based on an IP address.

6. A device comprising:
a memory; and
a processor coupled to the memory and the processor configured to,
acquire a log including site information for identifying each web site of a plurality of web sites that is previously accessed by each of access sources and content information for identifying each of the contents that is requested to each of the web sites by each of the access sources;
generate first combinations of a first content and a second content from the contents;
generate, for each of the first combinations, second combinations of the access source and the web site which provides both the first content and the second content for the access source;
determine degree of similarity by comparing each of the second combinations corresponding to each of the first combinations; and
determine a group that includes the first combinations corresponding to the second combinations whose degree of similarity is no less than a threshold.

7. The device according to claim 6, the processor further configured to: graph the first combination included in the group on a graph.

8. The device according to claim 7, wherein the first content and the second are connected with a line in the graph, a thickness of the line being based on a number of the second combination.

9. The device according to claim 6, wherein the degree of similarity of the second combination is calculated based on Jaccard coefficient.

10. The device according to claim 6, wherein the access source is identified based on an IP address.

11. A non-transitory computer-readable recording medium storing a program that causes a computer to execute a process comprising:
acquiring a log including site information for identifying each web site of a plurality of web sites that is previously accessed by each of access sources and content information for identifying each of the contents that is requested to each of the web sites by each of the access sources;
generating first combinations of a first content and a second content from the contents;
generating, for each of the first combinations, second combinations of the access source and the web site which provides both the first content and the second content for the access source;
determining degree of similarity by comparing each of the second combinations corresponding to each of the first combinations; and
determining a group that includes the first combinations corresponding to the second combinations whose degree of similarity is no less than a threshold.

* * * * *